United States Patent
Baumgart et al.

(10) Patent No.: US 8,287,028 B2
(45) Date of Patent: Oct. 16, 2012

(54) ROOF STRUCTURE FOR A CABRIOLET VEHICLE

(75) Inventors: Claus Baumgart, Ingersheim (DE); Tobias Korluss, Ludwigsburg (DE); Stefan Pozsgai, Sachsenheim (DE); Stefan Eichholz, Wurmberg (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 273 days.

(21) Appl. No.: 12/835,816

(22) Filed: Jul. 14, 2010

(65) Prior Publication Data

US 2011/0025088 A1    Feb. 3, 2011

(30) Foreign Application Priority Data

Jul. 28, 2009   (DE) .......................... 10 2009 035 043

(51) Int. Cl.
    *B60J 7/00*    (2006.01)
(52) U.S. Cl. .......... 296/107.17; 296/107.07; 296/107.08
(58) Field of Classification Search ............. 296/107.07, 296/107.08, 107.17
    See application file for complete search history.

(56) References Cited

U.S. PATENT DOCUMENTS

| 4,621,861 A | 11/1986 | Scaduto |
| 6,168,224 B1 | 1/2001 | Henn et al. |
| 2011/0025093 A1 | 2/2011 | Kasperowski |

FOREIGN PATENT DOCUMENTS

| DE | 100 15 061 | 6/2001 |
| DE | 20 2004 015 262 U1 | 11/2004 |
| DE | 202006012235 U1 | 11/2006 |
| DE | 20 2006 012 236 | 12/2006 |
| DE | 102007045780 A1 | 4/2009 |
| EP | 0836960 A1 | 4/1998 |

*Primary Examiner* — Lori Lyjak
(74) *Attorney, Agent, or Firm* — Gerald E. Hespos; Michael J. Porco

(57) ABSTRACT

A roof structure for a cabriolet vehicle has a top (10) with a top material and a substantially U-shaped corner bow (19) that extends transversely with respect to the longitudinal direction at a position substantially adjacent to a rear window. The corner bow (19) has lateral limbs (20) with free lower ends (21). Molded elements (23) are plugged onto the free lower ends (21) of the lateral limbs (20) of the corner bow (19) and can be plugged into recesses near the B pillars of a body structure of the cabriolet vehicle. The molded elements (23) are configured to guide the top material of the top (10) in sections in a closed state of the top (10). Sealing elements (27) are mounted on the molded elements (23) and interact with vertically running edges of side window panes.

4 Claims, 3 Drawing Sheets

ROOF STRUCTURE FOR A CABRIOLET VEHICLE

CROSS-REFERENCE TO RELATED APPLICATIONS

This application claims priority under 35 USC 119 to German Patent Application No. 10 2009 035 043.8 filed on Jul. 28, 2009, the entire disclosure of which is incorporated herein by reference.

BACKGROUND OF THE INVENTION

1. Field of the Invention

The invention relates to a roof structure for a cabriolet vehicle.

2. Description of the Related Art

DE 20 2006 012 235 U1 discloses a roof structure for a cabriolet vehicle that comprises a top material that is guided in the closed state of the top, in sections by a double hoop. The double hoop has two substantially U-shaped hoops each of which extends transversely with respect to the longitudinal direction of the roof structure or cabriolet vehicle. The rearmost hoop extends adjacent to a corner window of the motor vehicle and also is referred to as a corner bow. Sealing the top of this type of roof structure in the region of the side window panes of the motor vehicle, and guidance of the top material, poses problems.

DE 100 15 061 B4 discloses a linkage part of a roof structure of a cabriolet vehicle, in which the linkage part bears a seal.

In view of the above, an object of the invention is to provide an improved roof structure for a cabriolet vehicle.

SUMMARY OF THE INVENTION

The invention relates to a roof structure for a cabriolet vehicle in which lateral limbs of the corner bow have lower free ends that are plugged into recesses in the region of B pillars or of B pillar linings of a body structure of the cabriolet vehicle. Molded elements are plugged onto the lateral limbs of the corner bow. The molded elements guide the top material of the top in sections and bear sealing elements that interact with vertically running edges of side window panes.

The corner bow of the roof structure can be plugged in a simple manner by means of its lateral limbs, specifically the lower, free ends of the limbs, into or onto B pillars or B pillar linings of a body structure. The lateral limbs of the corner bow are molded elements that guide the top material of the top in sections and also bear sealing elements that interact with vertically running edges of the side window panes.

Accordingly, the corner bow of the roof structure can be mounted easily on the body structure of the cabriolet vehicle. Additionally, the molded elements guide the top material of the top in a defined manner. Furthermore, the molded elements ensure sealing in the region of the side window panes.

Preferred refinements of the invention will emerge from the following description. Exemplary embodiments of the invention will be explained on the basis of the drawing, without the invention being restricted to these exemplary embodiments.

DETAILED DESCRIPTION OF THE PREFERRED EMBODIMENT

Figure 1:
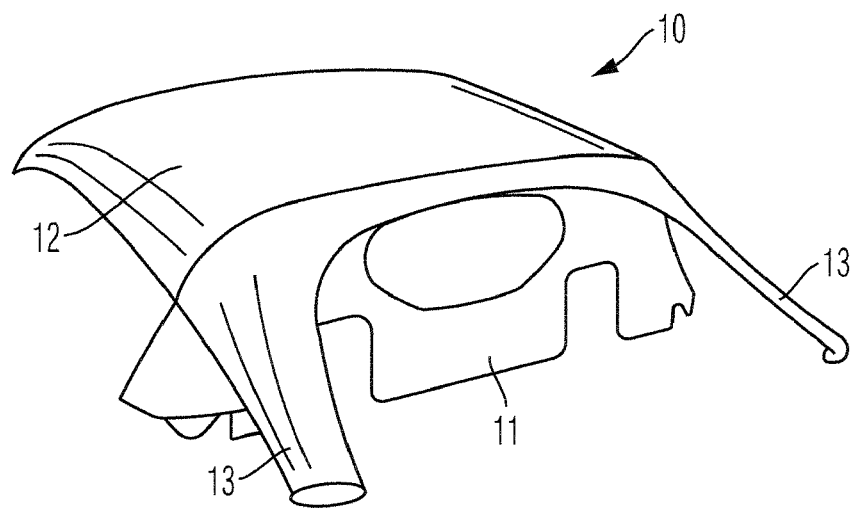
FIG. 1 is a schematic perspective view of a top of a roof structure for a cabriolet vehicle together with a weather partition for the cabriolet vehicle.

A roof structure for a cabriolet vehicle in accordance with the invention has a top 10 with a weather partition 11 that defines a rear window. The top 10 has a top material.

The top 10 has a main section 12 that forms the actual roof of the cabriolet vehicle in the closed state of the top 10. The main section 12 has lateral elongation sections 13 that enable the top 10 to be threaded into openings 15 in a body structure 14 of the cabriolet vehicle. The lateral elongated sections 13 of the top 10 can be threaded into the openings 15 and attached to a tensioning device to tension the top 10.

Figure 2:
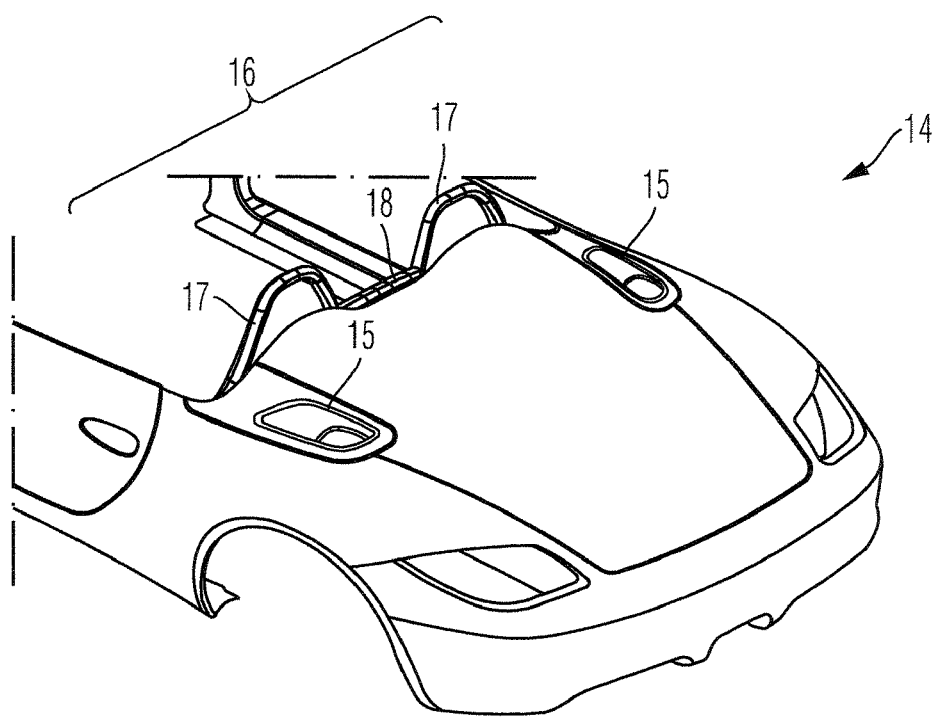
FIG. 2 is a schematic perspective view of a body structure of a cabriolet vehicle together with a rollover hoop.

FIG. 2 shows a rollover hoop 16 with two U-shaped hoop parts 17 that engage on a cross bar 18. The rollover hoop 16 may be considered part of the roof structure since the rollover hoop 16 guides a rear part of the main section 12 of the top 10, in the closed state.

The roof structure has a substantially U-shaped corner bow 19 that extends transversely with respect to the longitudinal direction of the roof structure or of the cabriolet vehicle at a position adjacent to the rollover hoop 16. The corner bow 19 can be seen at best in sections in FIG. 2.

The corner bow 19 has a substantially U-shaped contour defined by left and right substantially vertical limbs 20 and a horizontal limb (not shown in the figures) that connects the left and right substantially vertical limbs 20.

Figure 4:
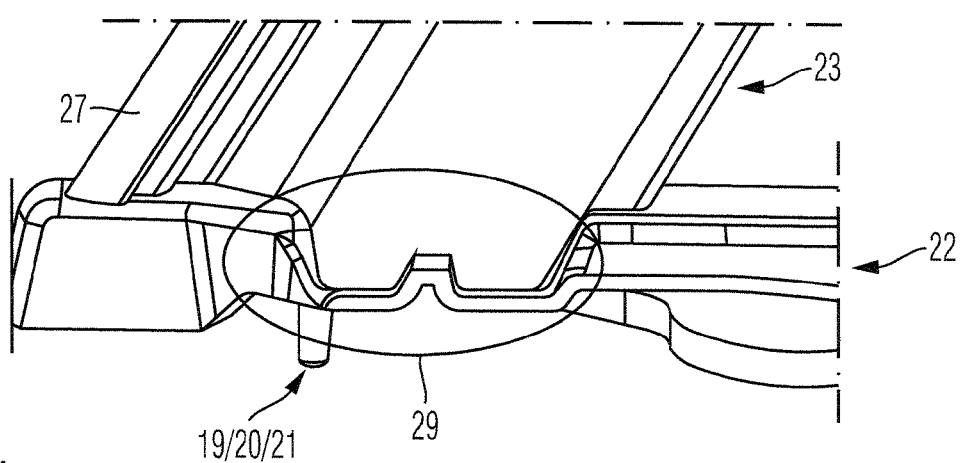
FIG. 4 is a cutout from the detail of FIG. 3.

The left and right limbs 20 of the corner bow 19 have lower free ends 21 that can be plugged into recesses (not shown in detail) of the B pillars or of a B pillar lining 22 of the body structure 14. The corner bow 19 of the roof structure accordingly is fastened to the body structure 14 of the cabriolet vehicle by simply being plugged in. FIG. 4 shows the lower free ends 21 of the lateral limbs 20 of the corner bow 19 that can be plugged into the recesses of the B pillars or B pillar lining.

The substantially vertical left and right lateral limbs 20 of the corner bow 19 have molded elements 23. The molded elements 23 are plugged onto the lateral limbs 20 of the corner bow 19.

Figure 5:
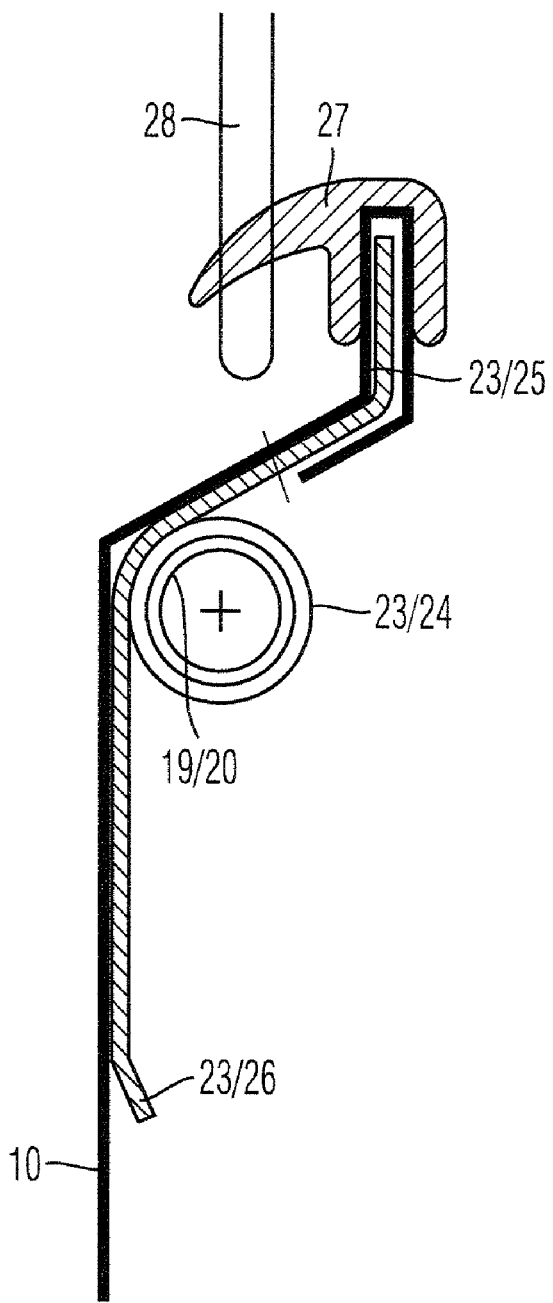
FIG. 5 is a cross section along line 3-3 in FIG. 3, but with top material.

Each molded element 23 has a tubular section 24 and guide sections 25 and 26 that extend in opposite directions from the tubular section 24, as shown in the cross section of FIG. 5. The lateral limbs 20 of the corner bow 19 comprise tubular elements that are inserted into a tubular section 24 of a corresponding molded element 23. In this way, a molded element 23 can be plugged in a simple manner onto a lateral limb 20 of the corner bow 19.

The molded elements 23 that are plugged onto the lateral limbs 20 of the corner bow 19 function to guide the top material of the top 10 in sections. More particularly, as shown in FIG. 5, the top material of the top 10 is guided on the sections 25 and 26 of each molded element 23.

Sealing elements 27 are mounted on the molded elements 23 that are plugged onto the lateral limbs 20 of the corner bow 19. The sealing elements 27 interact with a vertically running rim or a vertically running edge of an adjacent side window pane 28 of the motor vehicle to provide a sealing function in the region of said vertically running edge of the side window pane 28. Thus, the sealing elements 27 prevent an infiltration of water, for example, into the interior space of the cabriolet vehicle when the top 10 is closed. As shown in FIG. 5, the sealing element 27 is fastened to the section 25 of the respective molded element 23.

Figure 3:
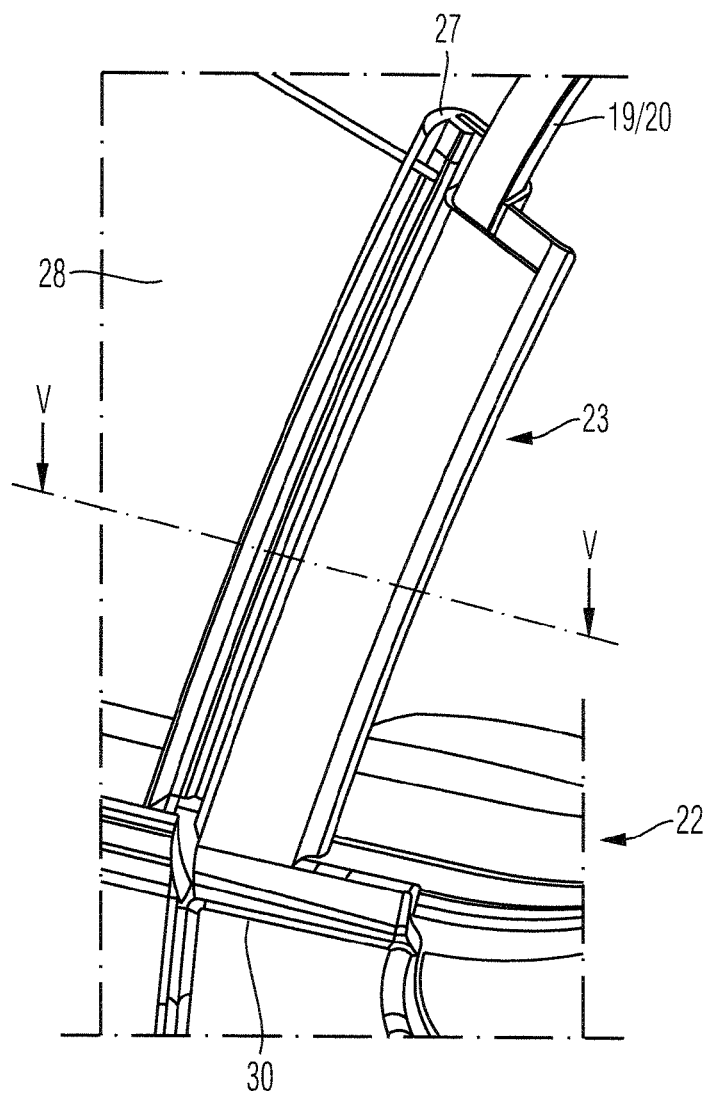
FIG. 3 is a schematic detail of the roof structure according to the invention.

A lower free end of each molded element 23 that has been plugged onto the corner bow 19 can be plugged into a corresponding recess in the region of the B pillar lining 22 by means of a tongue-and-groove connection 29, which is shown in the circled region of FIG. 4. The region of the tongue-and-groove connection 29 between a lower free end of a molded element 23 and the B pillar lining 22 is covered on the outside by a cover 30, as shown in FIG. 3.

The corner bow 19 of the roof structure can be mounted on a body structure 14 of a cabriolet vehicle in a simple manner. The easily mounted molded elements 23 of the corner bow 19 enable a top material to be guided in sections. Additionally, the sealing elements 27 mounted to the molded elements 23 interact with vertically running edges or rims of side window panes 28 to achieve a sealing function.

What is claimed is:

1. A roof structure for a cabriolet vehicle, the cabriolet vehicle having a body structure with B-pillars and side window panes in proximity to the B-pillars, the roof structure comprising: a top which with a top material; a substantially U-shaped corner bow extending transversely with respect to a longitudinal direction of the vehicle and disposed substantially adjacent to a rear window, the corner bow having lateral limbs with free lower ends, molded elements plugged onto the free lower ends of the lateral limbs of the corner bow, the molded elements being configured to be plugged into recesses in proximity to the B pillars of the body structure of the cabriolet vehicle and being configured for guiding the top material of the top in sections in a closed state of the top; and sealing elements mounted to the molded elements and configured for sealing engagement with vertical edges of the side window panes.

2. The roof structure of claim 1, wherein the corner bow extends adjacent to a rollover hoop.

3. The roof structure of claim 1, wherein the free lower ends of the molded elements have free lower ends configured for plugged engagement in recesses of B pillar linings of the body structure of the cabriolet vehicle.

4. The roof structure as claimed in claim 3, wherein the free lower ends of the molded elements and the recesses in the region of the B pillar linings define a tongue-and-groove connection.

\* \* \* \* \*